United States Patent [19]

Suzaki et al.

[11] 4,113,369
[45] Sep. 12, 1978

[54] MOTION PICTURE PROJECTOR

[75] Inventors: Kuniyoshi Suzaki, Machida; Akira Ashida, Yokohama; Takashi Itani, Kandaiji; Tateo Yamada, Yokohama; Masaya Maeda, Kawasaki; Kiyoshi Takahashi, Kunitachi; Hiroyuki Takimoto, Tokyo, all of Japan

[73] Assignee: Canon Kabushiki Kaisha, Tokyo, Japan

[21] Appl. No.: 736,223

[22] Filed: Oct. 27, 1976

[30] Foreign Application Priority Data

Oct. 31, 1975 [JP] Japan .................................. 50-131114
Oct. 31, 1975 [JP] Japan .................................. 50-131115
Oct. 31, 1975 [JP] Japan .................................. 50-131116

[51] Int. Cl.$^2$ .............................................. G03B 1/22
[52] U.S. Cl. ...................................... 352/194; 352/124; 352/169; 352/180; 352/221
[58] Field of Search ............... 352/124, 221, 229, 230, 352/157, 169, 194, 180

[56] References Cited

U.S. PATENT DOCUMENTS

| 3,439,981 | 4/1969 | Nemeth | 352/194 |
|---|---|---|---|
| 3,502,403 | 3/1970 | Riedel | 352/194 |
| 3,701,597 | 10/1972 | Keiner | 352/194 |
| 3,857,633 | 12/1974 | Easterly | 352/157 |

Primary Examiner—Monroe H. Hayes
Attorney, Agent, or Firm—Toren, McGeady and Stanger

[57] ABSTRACT

A motion picture projector having various functions such as, projecting and rewinding, all of which can be selectively performed by a single control knob, and including an intermittent-drive film advancing mechanism which comprises a pull-down structure, a compound cam of an up-and-down cam wheel and an in-and-out cam disk, and first and second cam followers arranged between the pull-down structure and the compound cam to be consecutively operated so that the pull-down claw enters the perforations of the film and moves it in a forward direction always by the length of a frame and at a desired frequency through a film gate mechanism. The film gate mechanism consists of a film guideway, a resilient thin aperture plate self-biased to move away from the film guideway and defining an actual projection aperture, and a movable film gate member arranged on the opposite side of the aperture plate from the guideway and biased to urge the aperture plate for guidance and support of the film against the guideway. The pull-down structure and the film gate member have respective input means arranged to be consecutively actuable by a common mode changeover means cooperative with the control knob. The mode changeover means has at least three switched positions, that is, a first position for a normal projecting operation, a second position where the pull-down structure is maintained disengaged from the in-and-out cam follower to project a still picture, and a third position where the film gate member and the aperture plate are spaced from the film guideway to permit continuous transportation of the film at a far faster speed than that occurring in the normal projecting mode of operation.

10 Claims, 6 Drawing Figures

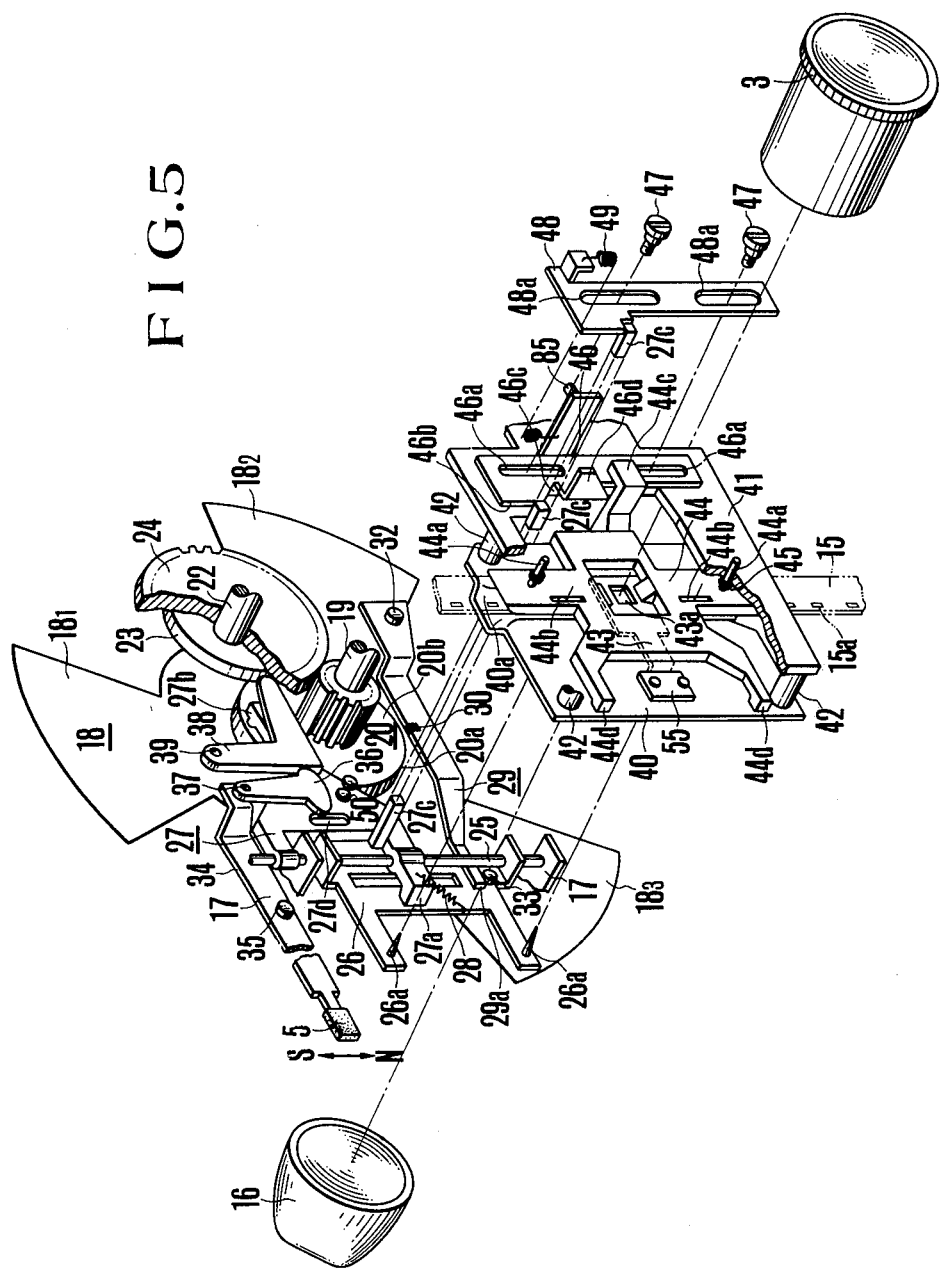

MOTION PICTURE PROJECTOR

BACKGROUND OF THE INVENTION

1. Field of the Invention

This invention relates to motion picture projectors, and more particularly to improvements in a motion picture projector with respect to the film gate structure and to the selection of the various modes of operation by a single control knob.

2. Description of the Prior Art

In the design of a conventional motion picture projector such as those adapted for home use, it is already known to increase the number of functions or modes of operation as including normal motion picture projecting, still picture projecting, slow motion picture projecting, high speed film winding, and high speed film rewinding. Selection of all such functions by use of a single control knob has, however, necessitated a far more complicated operating mechanism. The conventional design features as directed to the provision of as simple a mechanism as possible from the operating and economic standpoints have resulted in successive manipulation of various control members to operate the projector. This constitutes one of the conventional problems.

Another problem that exists with the projection gate structure is that as a projection aperture defining an effective film frame area is formed in a film pressing plate situated between a light source and a film to guide and support the film against a front plate of an overbored aperture registering with the projection aperture, light rays which pass through the projection aperture at the edge thereof and which impinge on the film are diffusely reflected by the film thickness with a resultant reduction of sharpness at the edge of a viewing area on the projection screen, thus giving an unpleasant impression to the viewer.

To avoid further reduction of such sharpness by the projection gate itself, it is required that the inner edge of the projection aperture must be made sharp. In this case, the surface between the inner and outer edges of the projection aperture is inclined toward the projection light source so that the temperature of the film pressing plate in the vicinity of the projection aperture is increased to a very high level by the heating effect of the radiated rays from the light source and impinging on the pressing plate. For this reason, selection of materials for making the pressing plate has been limited to metal, although thermoplastic resin is very advantageous in manufacturing complicated structure components by extrusion and injection molding techniques. Accordingly, thus far it has been impossible to arrange the film gate mechanism with the projection gate therein so that a single control knob enables all of the various modes of operation.

SUMMARY OF THE INVENTION

The present invention has as a first object the elimination of the above mentioned conventional drawbacks and the provision of a motion picture projector in which the operating mechanism is simplified and made compatible with the simplified actual control for operating the projector.

A second object of the invention is to provide a motion picture projector having at least the four functions of motion picture projecting, still picture projecting, film rewinding and high speed film winding, all of which can be selectively performed by a single control knob accessible from outside the projector.

A third object of the invention is to provide a motion picture projector capable of providing a viewing area with high sharpness at the edge thereof.

A fourth object of the present invention is to provide a motion picture projector having a film gate mechanism with a film pressing plate made of thermoplastic resin and adapted so that the single control knob enables all of the above specified four functions.

These and other objects and features of the invention will become apparent from the following detailed description taken in conjunction with the accompanying drawings in which:

FIG. 5 is a similar view to that of FIG. 2 and showing an example of modification of the actuating means of FIG. 2 by providing a vibration preventing means.

DESCRIPTION OF THE PREFERRED EMBODIMENT

Figure 1:
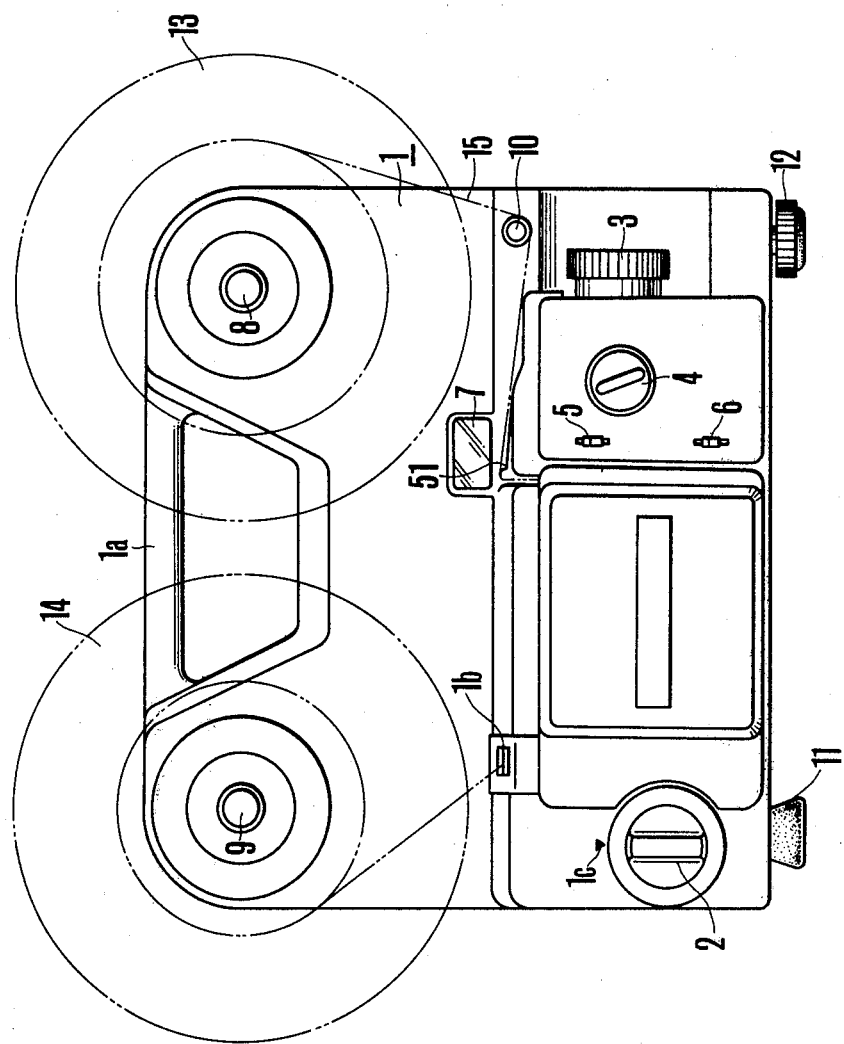
FIG. 1 is a side elevational view, partly schematic, of a motion picture projector of the invention.

Referring first to FIG. 1, there is shown a motion picture projector for a Super 8 mm movie film to which the principles of the invention are applicable as explained below in details, although the invention is not confined thereto.

The projector has a basic frame structure 1 which is provided with a carrying handle 1a formed therein and with a control knob 2 cooperative with a stationary index 1c on the side panel of the frame structure 1. This control knob 2 carries a number of symbols representing "OFF;38 , "normal motion picture projecting", "still picture projecting", "high speed film winding" and "high speed film rewinding" modes of operation, and arranged in circumferentially spaced relation for registration one at a time with the stationary index 1c, wherein the projector is set for that one of the modes of operation which corresponds to the symbol on the knob 2 manually selected to register with the index 1c through intermediary means including cam means which will be described in detail later. A projection lens mount 3 with a focusing control knob 4 therefor is situated in the forward part of a projection chamber housing. The only other controls necessary are a slow motion setting lever 5 and a framer 6. To indicate whether or not the projector is supplied with electric power from an external AC voltage source, there is provided a pilot lamp not shown behind a window 7 formed in a portion of the structure 1. The pay-out reel spindle is indicated at 8, and the take-up reel spindle is indicated at 9, their respective suitable reels being illustrated by phantom lines 13 and 14 respectively. The film 15 at first convoluted on the pay-out reel 13 on the spindle 8 may be looped about a guide roller 10 and then about a damper 51 adjacent a film inlet of the projection chamber, and then its end may be inserted into the inlet. Assuming now that the control knob 2 is set in a first rotated position, when the film end has reached the intermittent-drive film advancing mechanism, the film is automatically threaded through the projection gate (see FIG. 2) to a film outlet 1b and therefrom passed to the take-up reel 14 on the spindle 9 which is being rotated by the energized motor.

Figure 2:
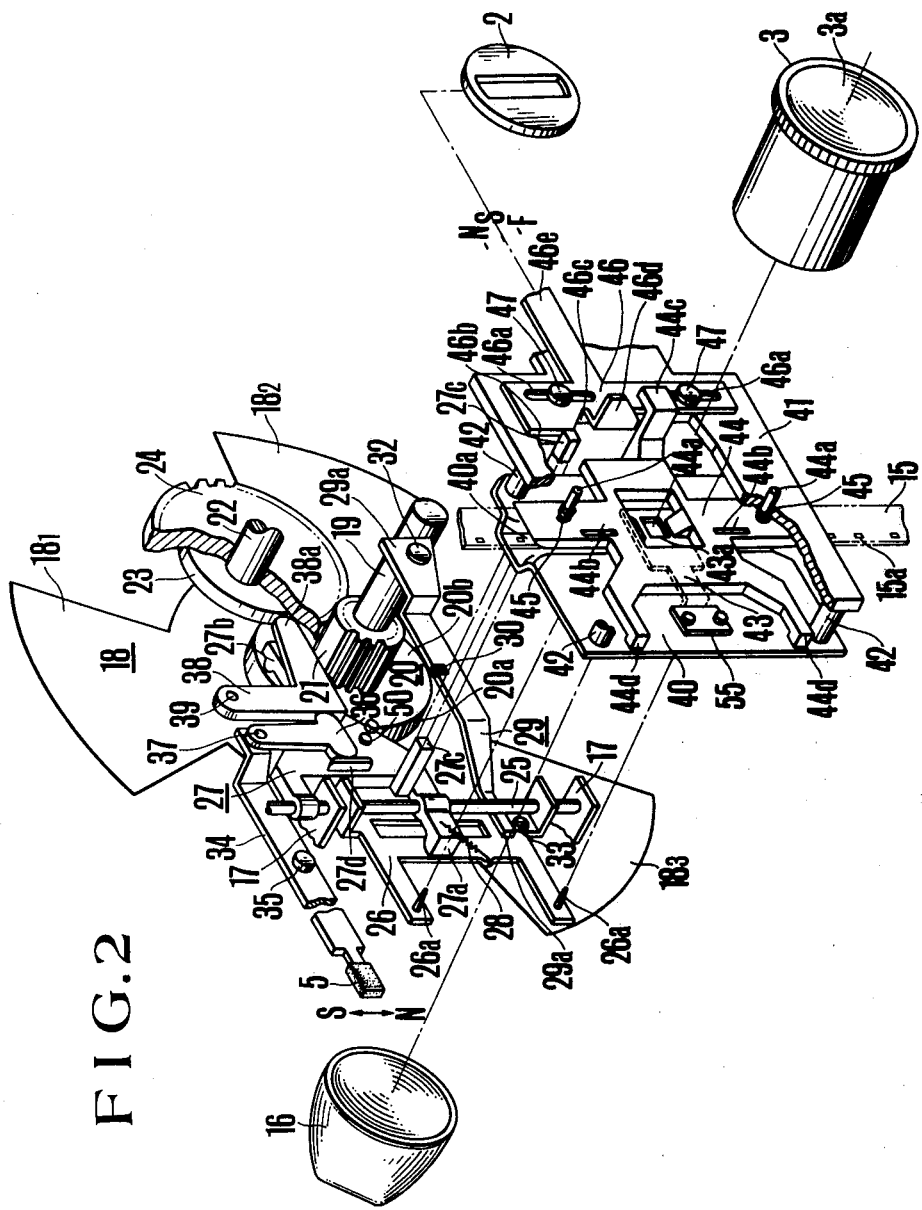
FIG. 2 is a perspective view of a pull-down claw mechanism and a film gate mechanism exploded from each other and constituting part of an operating mechanism of the projector of FIG. 1.

Referring now to FIG. 2, the intermittent-drive film advancing mechanism and the film gate mechanism are shown as separated from each other for the purpose of facilitating a better understanding of the construction and arrangement of the basic parts cooperating with a mode changeover device embodying the present invention.

The intermittent-drive film advancing mechanism is situated between a rotary shutter 18 and a pair of parallel vertical walls or panels 40 and 41 having a projection gate and comprises a pull-down structure 26 pivotally and slidably mounted on a vertical shaft 25 and having two arms horizontally extending across a film passage to the left as viewed from the front or in the figure on either side of the projection gate and spaced apart from each other so that claws 26a forwardly extending from the respective pull-down arms enter the perforations of film 15 and normally move it downwardly through the length of exactly one frame without causing the arms to block the projection aperture, a compound cam in the form of a disk 20 having in-and-out circumferential camming surface 20b and an up-and-down peripheral camming surface 20a, and fixedly mounted on a common shaft 19 of the rotary shutter 18, an in-and-out cam follower lever 27 pivotal about the common shaft of the pull-down 26 and biased by a compressed spring 50 to urge a lobe 27b for scanning engagement with the in-and-out camming surface 20b, and an up-and-down cam follower lever 29 pivoted at one end 29a thereof at a pivot pin 32 and arranged between the peripheral camming surface 20a of the compound cam 20 and a stud 33 mounted on the bottom corner of the pull-down 26 so that the lever 29 is maintained in sliding engagement at the center thereof with the up-and-down camming surface 20a through a lubricating oil-filled porous member 30, as the pull-down 26 is biased upwardly by a tension helical spring 28 to establish positive connection between the lever end 29b and the stud 33 even during the pivoting process of the pull-down 26. This spring 28 also serves to urge the pull-down 26 for normally abutting engagement against a lug 27a of the in-and-out cam follower lever 27, so that in-and-out motion from the lever 27 is imparted to the pull-down 26 when the slow motion picture projection control knob 5 of FIG. 1 is set in "N" position.

A slow motion picture projection control mechanism comprises an actuating lever 34 pivotal about a pin 35 fixedly mounted on the chamber housing and having the control knob 5 mounted at one end thereof, the opposite end of which movably carries a detent lever 36 pivoted at a pin 37 and having two parentheses portions arranged to be brought into abutment against respective elements, namely, a tab 27d of the in-and-out cam follower lever 27 and an L-shaped lever 38 pivoted at a pivot pin 39 when the control knob 5 is set in "S" position illustrated in FIG. 2, and a cam wheel 23 eccentrically mounted on a shaft 22 and cooperating with the L-shaped lever 38 through sliding engagement at the cam follower lobe 38a against the camming surface of the cam wheel 23 to establish one cycle of in-and-out pull-down claw operation every three revolutions of the compound cam 20 which in "S" position, as a gear 24 fixedly connected to the common shaft 22 of the cam wheel 23 meshes always with a pinion 21 fixedly connected to the common shaft 19 of the compound cam disk 20.

The compound cam disk 20 is so designed that the pull-down claws 26a operate with the shutter 18 in a conventional manner such that: Now assuming that the actuating lever 34 for slow motion picture projection is moved from the illustrated position to a clockwise rotated position where the detent lever 36 is out of engagement with both of the in-and-out cam follower lever tab 27d and the L-shaped lever 38 to insure that in-and-out motion of the pull-down claws 26a is controlled by the circumferential camming surface 20b every one revolution of the compound cam disk 20, and that the shaft 19 is driven for rotation by the energized electric motor 60 (see FIG. 4) through a gear train terminating at the pinion 21, when the up-and-down cam follower lever 29 has reached the clockwise-most position at which the radius of the cam disk 20 between its axis and the lubrication member 30 is minimum as compared with the remaining radii, the pull-down claws 26a are about to enter the perforations of the film 15 as the in-and-out cam follower lever lobe 27b arrives at a point from which the circumferential camming surface begins to slope down rapidly, while one of three shutter blades $18_1$, $18_2$ and $18_3$, these blades being equally spaced apart from each other, is just to block the passage of a projection light beam from a lamp 16 to the projection aperture. Starting from this position, the pull-down claw 26a enter the perforations of the film 15, then draw the film downwardly past the projection aperture by the length of a frame within a time interval after which the first-named shutter blade is moved away from the projection light passage, and then remain at rest in the advanced position until the third shutter blade comes to block the projection light passage. At this time, the in-and-out cam follower lever lobe 27b has arrived at a point from which the circumferential camming surface 20a begins to rise rapidly to such an extent as to retract the claws 26a from the perforations of the film 15, and upon subsequent thereto the radius of the up-and-down cam disk 20a begins to decrease at such a rate as to permit an upward movement of the pull-down 26 within a time interval after which the third shutter blade is moved away from the projection light passage. Thus, a single cycle of pull-down claw operation is determined by a single revolution of the compound cam disk 20 during which a single picture frame is projected with three impulses of illumination of light from the lamp 16. It is to be noted that during the time when the claws 26a are withdrawn from the film and move upwards, the film is left behind stationary by means to be described in detail later.

The configuration of the single cam 23 is such that, as the slow motion picture setting lever 34 is turned clockwise to insert the parenthesis portions of the detent lever 36 into a space between the in-and-out cam follower lever tab 27d and the L-shaped cam follower lever 38, during a first revolution of the compound cam 20, the single cam 23 has a one-third circular portion of constant minimum radius engaging the L-shaped cam follower lever end 38a so that the in-and-out cam follower lever 27 continues to move in engagement at its lobe 27b with the circumferential camming surface 20b of the compound cam 20 until a first cycle of pull-down claw operation is completed. The remaining circular portion of the single cam 23 is of increasing radii followed successively by constant maximum and decreasing radii so that further rotation of the single cam 23 causes clockwise movement of the L-shaped lever 38 about the pivot pin 39 which in turn causes clockwise movement of the in-and-out cam follower lever 27 through the detent lever 36 against the force of the spring 50 until the lever lobe 27b is disengaged from the camming surface 20b at any point in time of the subsequent two revolutions of the compound cam 20. As a result, the subsequent two cycles of up-and-down movement of the pull-down 26 is not combined with the in-and-out movement which would be otherwise imparted thereto when in the normal projecting mode of operation, thereby the film 15 is advanced at a frame frequency as fast as ⅓ times that occurring in the normal motion picture projection past the film gate mechanism.

The film gate mechanism includes two parallel vertical walls or panels 40 and 41 fixedly connected to each other in longitudinally spaced relation through four spacers 42 and respectively provided with registering light-admitting openings or windows not shown of larger sizes than that of the projection aperture, the front panel 41 being illustrated as partially broken for the purpose of a better understanding of the invention. The rear panel 40 is further provided with a film guideway 40a formed as embossed rearwardly in alignment with its window and with a pair of vertically elongated slots not shown arranged in alignment with each other and with the row of the perforations of the film 15 to permit entering followed by withdrawing operation of the pull-down claws 26a. The film gate mechanism further includes a resilient thin metal plate 43 fixedly secured at one end thereof, in this instance, at the left side end thereof on the rear panel 40 by means of rivets and having a rectangular projection aperture 43a defining an effective area of a picture frame to be projected through a projection lens 3a in the lens mount barrel 3 with light from the lamp 16 onto a projection screen not shown and which can be made so sharp at the edge that the degree of diffusion of light at the edge of a viewing area on the projection screen is minimized with the help of forward location of the aperture plate 43 relative to the film 15. The aperture plate 43 is self-biased for forward movement away from the film as if it were pivotal at the riveted one end 55, and positioned in a space between the upper and lower pull-down claw passable slots. When the vertical length of the aperture plate 43 is so large as to overlap the slots, it is of course necessary to provide suitable cutouts in alignment with the slots. In order to control the position of the aperture plate 43 and also to facilitate automatic threading of the film 15 past the projection aperture 43 through the film guideway, there is provided a movable film gate member or holder 44 which may be made from thermoplastic resin. This holder 44 has two bracket portions or arms directed upwardly and downwardly over the film guideway 40a to form a single film channel and provided with a pair of vertically elongated slots 44b for passage of the pull-down claws 26a. The holder arms have respective pins 44a fixedly mounted thereon and normally extending forwardly into respective holes provided through the front panel 41. The holder 44 is biased toward the rear by two compressed coil springs 45 coiled about respective pins 44a and which overcome the force of the aperture plate spring 43 so that so long as the holder 44 is disengaged at its angled-off head 44c from an actuating slide 46 constituting part of an operating mode changeover device, the film 15 is guided and supported against the guideway 44a by the combination of the aperture plate 43 and the holder 44. The holder 44 has two legs 44d with respective feet about which the holder 44 is pivotal.

The operating mode changeover control slide 46 has a pair of longitudinally elongated slots 46a in which respective pins 47 are engaged, the pins 47 having a larger diameter than the diameter of the portions thereof which pass through the slots 46a and being fixedly secured on the front panel 41, and is arranged to be slidingly movable in a vertical direction on the front panel 41 for selective cooperation with either of the movable film gate holder 44 and the in-and-out cam follower lever 27 through their respective input members 44c and 27c. Responsive to one setting of the projector control knob 2, the slide 46 is automatically moved to take one of three distinct switched positions designated by "N", "S" and "F" through a mechanical linkage not shown engaging the projection 46e of the slide 46. When the control knob 2 is set in the normal motion picture projecting position, the slide 46 assumes the uppermost displaced position where the first-named input member 27c normally extending forwardly from the in-and-out cam follower lever 27 through the rear and front panels 40 and 41-cutouts into the path of movement of a first cam portion 46b is allowed to move freely in a space adjacent a recessed portion 46c of the slide 46 so that the full operation of the pull-down claws 26a takes place, while the holder 44 is acted on, the film together with the aperture plate 43 as a second cam portion 46d is located out of engagement with the second-named input member or the angled-off head 44c of the holder 44. When the control knob 2 is moved from the "N" position to the still picture projecting position or "S" position, the slide 46 is displaced downwardly to an intermediate position where the first input member 27c is caused to ride on the first cam portion 46b of the slide 46 so that the in-and-out cam follower lever 27 is turned clockwise to prevent the entering and withdrawing operation of the pull-down claws 26a, while the second cam portion 46d is located near the second input member 44c without any action of the latter. When the control knob 2 is moved from "S" position to either of the high speed film winding and rewinding positions, the slide 46 is displaced to the lowermost position where the first cam portion 46b continues to lock the first input member 27c, while the second cam portion 46d causes clockwise pivoting movement of the holder 44 about the feet 44d against the force of the springs 45 so that the film gate mechanism is opened to permit high speed transportation of the film 15 therethrough by a driving mechanism for the pay-out and take-up reel sprindles 8 and 9 of FIG. 1.

Figure 4:
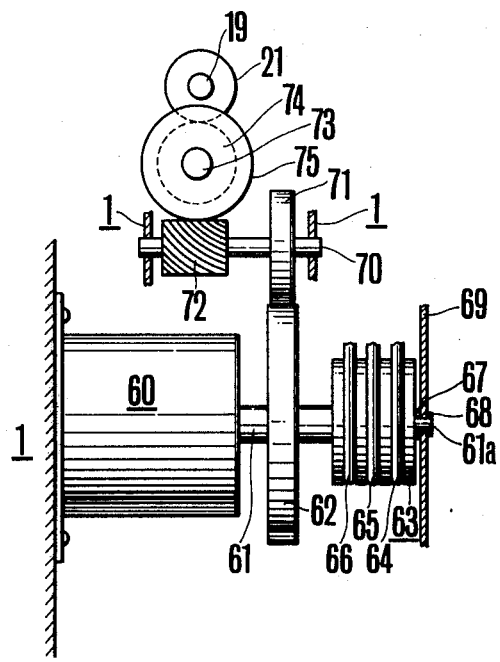
FIG. 4 is a fragmentary side elevational view of a motor driven gear train taken along line A — A of FIG. 3.

FIG. 4 shows the driving mechanism including an electric AC motor 60 fixedly connected to the basic frame structure 1 and having an output shaft 61, a gear train for transmitting motion of the motor 60 to the shutter driving shaft 19 of FIG. 2 constituting part of the intermittent-drive film advancing mechanism, and a pulley 63 fixedly mounted on the output shaft 61 and having three circumambient sheave grooves for respective driving pulley belts 64, 65 and 66. The output shaft 61 has a slightly outwardly extended portion 61a of a reduced diameter on which is movably mounted a straight lever 69 spaced apart from the pulley 63 by means of a spacer 67 and prevented from escaping therefrom by means of a snap ring 68. The gear train comprises a large gear 62 fixedly mounted on the output shaft 61 of the motor 60 and meshing with a small gear 71 fixedly mounted on a shaft 70, the shaft 70 being journalled in the basic frame structure 1, a worm 72 fixedly mounted on the common shaft of the gear 71 and meshing with a worm wheel 73, and a smaller gear 74 fixedly mounted on a common shaft of the worm wheel 73 and meshing with the pinion 21 of FIG. 2 fixedly mounted on the shutter driving shaft 19.

Figure 3:
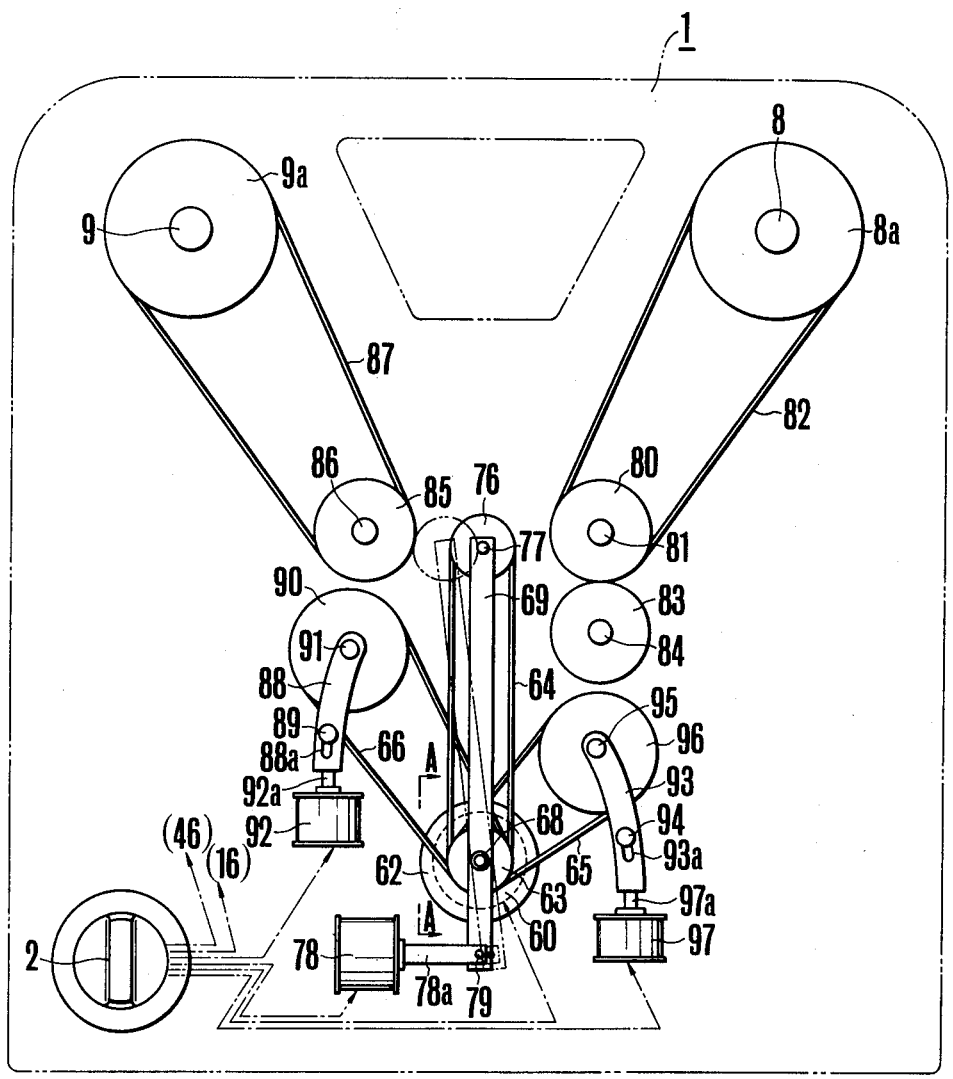
FIG. 3 is a side elevational view of a driving mode changeover device for the film transporting mechanism of the projector of FIG. 1.

FIG. 3 shows a drive control mechanism associated with the motor driving mechanism of FIG. 4 for controlling operation of the pay-out and take-up reel spindles 8 and 9 to run the film in either of the forward and reverse directions through the film gate mechanism at either of the normal and high speeds in automatic response to the setting of the projector control knob 2. A first pulley arrangement for driving the take-up reel sprindle 9 for rotation in a forward direction at a normal speed dependent upon the frame frequency of the intermittent-drive film advancing mechanism comprises a small pulley fixedly mounted on a rotatable shaft 77 normally extending from the top end of the lever 69 and having a frictional belt groove sufficiently deep to retain the first-named driving belt 64 securely while rendering the frictional peripheral salient of the pulley 76 for exposure to so large extent that when the control knob 2 is set for normal motion picture projection, a frictional driving engagement by the pulley 76 with a pulley 85 fixedly mounted on a rotatable shaft 86, the shaft 86 being journalled in the frame structure 1, is established as the lever 69 is turned counter-clockwise as viewed in FIG. 3 by an actuating and release plunger 78a connected at one end to a pivot pin 79 extending from the opposite end of the lever 69 to that having the pulley 76, the opposite end of which plunger 78a is inserted in a core space of a magnetic winding 78. The pulley 85 is provided with a circumambient belt groove sufficiently deep to retain an endless belt 87 securely which is trained over a pulley 9a coaxially fixed connected to the take-up reel spindle 9, and with the correspondingly salient flanged portions flanking the groove and made from a material having a high friction coefficient. The diameter of the pulley 85 is far larger than that of the pulley 76, but relatively smaller than that of the pulley 9a.

A second pulley arrangement for driving the take-up reel spindle 9 for rotation in the forward direction at a high speed to wind the film comprises a pulley 90 having a larger diameter than that of the pulley 85 and provided with a circumambient belt groove sufficiently deep to retain the third-named driving belt 66 of FIG. 4 securely while rendering the correspondingly salient flange portions sufficiently frictional for purposes of driving engagement with the pulley 85 which is established when the control knob 2 is set in position for high speed film winding, as an arcuate lever 88 movably carrying the pulley 90 at the top end thereof on a fixedly mounted shaft 91 is moved upward until the pulley 90 engages the pulley 85 by a plunger 92a having at one end thereof a guide pin 89 extending through a slot 88a provided through the bottom end portion of the arcuate lever 88, the opposite end of which plunger 92a is inserted into a core space of a magnetic winding 92.

A third pulley arrangement for driving the pay-out reel spindle 8 for rotation in a reverse direction at a high speed to rewind the film comprises a first pulley 80 fixedly mounted on a rotatable shaft 81, the shaft being journalled in the frame structure 1, and having a circumambient belt groove sufficiently deep to retain an endless belt 82 securely which is trained over a pulley 8a fixedly connected to the pay-out reel spindle 8, while rendering the correspondingly salient flanged portions sufficiently frictional, as the pulley 80 is always engaged with a rotatable roller 83 fixedly mounted on a rotatable shaft 84, the shaft 84 being journalled in the frame structure 1, and a second pulley 96 rotatably mounted on a shaft 95 extending from the top end portion of an arcuate lever 93 and having a circumambient belt groove sufficiently deep to retain the second-named driving belt 65 of FIG. 4, while rendering the correspondingly salient flanged portions sufficiently frictional for purpose of driving engagement with the roller 83 which is established when the control knob 2 is set in position for film rewinding as the arcuate lever 93 is moved upwards until the pulley 96 engages with the roller 83 by a plunger 97a having at one end thereof a guide pin 94 extending through a slot 93a provided through the arcuate lever 93 at the bottom end portion thereof, the opposite end of which plunger 97a is inserted into a core space of a magnetic winding 97. The diameters of the first pulley 80 and the roller 83 are almost equal to each other, and smaller than that of the second pulley 96 which is almost equal to the diameter of the pulley 90.

The operation of the projector of FIGS. 1 to 4 will next be explained in connection with the various modes of operation, namely, (1) normal motion picture projecting, (2) still picture (single frame) projecting, (3) slow motion picture projecting, (4) high speed film winding, and (5) high speed film rewinding.

(1) Normal motion picture projection

The slow motion picture projection control lever 34 may at first turned by having its control knob 5 switched to the "N" position where the parentheses portions of the detent lever 36 are out of engagement with both of the in-and-out cam follower lever tab 27d and the L-shaped lever 38 so that the camming action of the slow motion control cam 23 is not transmitted to the in-and-out cam follower lever 27. Next when the control knob 2 is moved to the first rotated position: the projection lamp 16 is turned on; the motor 60 is energized; the first magnetic winding 78 is energized to turn the lever 69 counter-clockwise, whereby the pulley 76 is brought into driving engagement with the pulley 85; and the operating mode changeover control slide 46 is set to the "N" position where the input member 27c of the in-and-out cam follower lever 27 is free from the first cam portion 46a, and the input member 44c of the film holder 44 is free from the second cam portion 46d, whereby the film gate mechanism is closed. At this time, the motion of motor 60 is transmitted through the output shaft 61, pulley 63, belt 64, pulley 76, pulley 85, belt 87, and pulley 9a to the take-up reel spindle 9, whereby the take-up reel 14 on the spindle 9 is rotated clockwise, and also transmitted through the output shaft 61, gears 62 and 71, shaft 70, worm 72, worm wheel 75, shaft 73 and gear 74 to the pinion 21.

As the pinion 21 is rotated, the compound cam 20 and the shutter 18 are continuously rotated along with the slow motion picture projection control cam 23. Upon rotation of the compound cam 20, the in-and-out cam follower lever 27 is at first turned counter-clockwise which in turn causes counter-clockwise movement of the pull-down 26 under the action of the spring 28, thereby the claws 26a is caused to enter the perforations of the film 15. At this time, the up-and-down cam follower lever 29 is already set in the clockwisemost position so that the rocking pivot point of the pull-down structure 26 is in the uppermost position. It is now to be noted that at this time the gear 24 and single cam 23 are also rotated, but the single cam 23 gives no effect to the in-and-out cam follower lever 27 because the L-shaped cam follower lever 38 therefor is out of engagement with the single cam 23. After the pull-down claws 26a have entered the perforations of the film 15, further rotation of the compound cam 20 causes a counterclockwise movement of the up-and-down cam follower lever 29 which in turn causes a downward movement of the pull-down 26 against the force of the spring 28 while maintaining the claws 26a engaged in the perforations of the film 15, whereby the film is advanced by the length of a frame past the projection aperture 43a. During the time when the film 15 is advanced, one of the three shutter blades 18 is located between the lamp 16 and the projection aperture 43a to interrupt light from the lamp 16 to illuminate the film 15. After the completion of advancement of one frame, the remaining two shutter blades pass successively across the path of the projection light between the lamp 16 and the projection aperture 43a. During the time when the cutout between the successive shutter blades comes to alignment with the projection aperture 43a, the picture frame is projected onto a projection screen. In synchronism with the passage of the third shutter blade across the projection light path, the in-and-out cam follower lever 27 is initiated to turn clockwise which in turn causes clockwise movement of the pull-down 26 by the lever lug 27a, whereby the claws 26a are withdrawn from the perforations of the film 15. In synchronism therewith, the up-and-down cam follower lever 29 is turned clockwise to cause an upward movement of the pull-down 26 while leaving the film 15 stationary behind relative to the projection aperture 43a, as the holder 44 is pressed toward the film guideway 40a under the action of the springs 45 overcoming the tendency of the aperture plate 43 to move away therefrom. Such procedure repeats itself so that a motion picture is projected on the screen. That portion of the film which is advanced past the projection aperture by the intermittent-drive film advancing mechanism is wound up by the take-up reel 14 on the spindle 9 in an automatic manner. It is to be noted that while the take-up reel 14 is driven for rotation by the motor 60, the pay-out reel 13 on the spindle 8 is not driven by the motor 60, thus being free from driven rotation. Accordingly, the pay-out reel 13 is rotated by the only force of withdrawing the film 15 by the pull-down claws 26a.

(2) Slow motion picture projection

While permitting the control knob 2 to remain in the position for the normal motion picture projection, the operator needs only to throw the slow motion setting lever knob 5 to the "S" position, thereby the lever 34 is turned clockwise to insert the parentheses portions of the detent lever 36 into the motion-transmitting engagement between the in-and-out cam follower lever tab 27d and the L-shaped lever 38. With this arrangement, when the pinion 21 is driven for rotation by the motor 60, the single cam 23 is acted on the in-and-out cam follower lever 27 through the levers 36 and 38 in such a manner that rotation of the cam 23 with the circular portion of increasingly varying radii engaging the L-shaped lever end 38a shifts the L-shaped lever 38 in a clockwise direction which in turn causes clockwise movement of the in-and-out cam follower lever 27 until the lever lobe 27b is disengaged from the camming surface 20b. Such movement of the in-and-out cam follower lever 27 causes clockwise movement of the pull-down 26 with the claws 26a being maintained out of engagement with the perforations of the film 15. Further, rotation of the single cam 23 with the circular portion of decreasingly varying radii engaging the L-shaped lever end 38a shifts the lever 38 in a counter-clockwise direction which in turn causes counter-clockwise movement of the in-and-out cam follower lever 27 under the action of the spring 50, thereby the lever lobe 27b is brought into sliding engagement with the camming surface 20b which is maintained until one cycle of pull-down claw operation is completed to advance the film by the length of a frame. In other words, while the shutter 18 and the compound cam 20 are always being rotated, the pull-down claws 26a is rendered fully operative only when the single cam 23 engages at the circular portion of minimum radii with the L-shaped lever end 38a. This circular portion of minimum radii occupies about one third of the integrated circular portions. Further, during one revolution of the slow motion control cam 23, three revolutions of the compound cam 20 and shutter 18 take place. Therefore, the speed of advancement of the film 15 in the slow motion picture projecting mode of operation is reduced to ⅓ times that in the normal projecting mode.

(3) Still picture (single frame) projection

The control knob 2 may be moved to a position for the still picture projection. At this time, the projection lamp 16 is turned on; the motor 60 is energized; the magnetic winding 78 is energized; and the mode changeover slide 46 is displaced to the "S" position (see FIG. 2), wherein the first input member 27c is forcibly caused to ride on the first cam portion 46b. Such riding-on movement of the input member 27c causes clockwise movement of the in-and-out cam follower lever 27 resulting in disengagement of the lever lobe 27b from the camming surface 20b and also in maintenance of the pull-down claws 26a disengaged from the perforations of the film 15. Therefore, the pull-down 26 is limited in motion only to the up-and-down direction and does not advance the film 15 despite of the fact that the compound cam 20 is rotated. The film 15 remains stationary relative to the projection aperture and continues to be projected in still picture projecting mode. During this still picture projecting process, a not shown dark filter is inserted into a space between the lamp 16 and the film 15 in automatic response to the displacement of the mode changeover slide 46.

(4) High speed film winding operation

The control knob 2 may be moved to a position for high speed film winding operation. At this time, the lamp 16 is turned off; the motor is energized; the magnetic windings 78, 97 are deenergized; the magnetic winding 92 is energized; and the mode changeover slide 46 is displaced to the third or "F" position wherein in addition to the riding-on engagement of the first input member 27c on the first cam portion 46b, the second input member 44c is caused to ride on the second cam portion 46d so that the holder 44 is turned clockwise against the force of springs 45 to permit the aperture plate 43 to move away from the film guideway 40a. Thus, the film gate is opened to run the film 15 therethrough at a high speed as the take-up reel spindle is rotated at a higher speed than that occurring in the projecting modes of operation through the second driving pulley arrangement. In other words, when the magnetic winding 92 is energized, the pulley 90 is brought into driving engagement with the pulley 85 to transmit motion of the motor 60 through the output shaft 61, pulley 63, belt 66, pulleys 90 and 85, belt 87 and pulley 9a to the spindle 9. At this time, the compound cam 20 is also driven for rotation, but the in-and-out motion of the pull-down claws 26a is prevented from taking place, as being retracted entirely from the film guide channel because the in-and-out cam follower lever 27 is maintained in the clockwise-most position by the first input member 27c riding on the first cam portion 46b of the mode changeover slide 46.

(5) High speed film rewinding operation

The control knob 2 may be moved to a position for the high speed film rewinding operation. At this time, the lamp 16 is lighted off; the motor 60 is energized; the magnetic windings 78 and 92 are deenergized; the magnetic winding 97 is energized to render effective the third driving pulley arrangement; and the mode changeover slide 46 is in "F" position. As the film gate is fully opened, the film 15 is transported past the film gate with minimized friction against the surfaces of the film channel at a high speed in a reverse direction as the pay-out reel spindle is driven for rotation in a counter-clockwise direction through the third driving pulley arrangement. In other words, when the magnetic winding 97 is energized, the pulley 96 is brought into driving engagement with the roller 83 to transmit motion of the motor 60 through the output shaft 61, pulley 63; belt 65; pulley 96, roller 83, pulley 80, belt 82 and pulley 8a to the spindle 8. During this rewinding process, the pull-down claws 26a are maintained fully retracted from the film guide channel.

Figure 6:
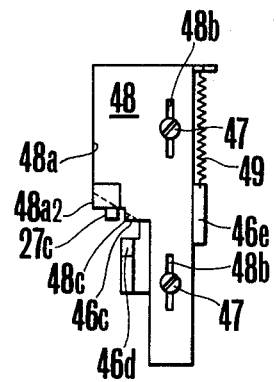
FIG. 6 is a front elevational view showing the details of the vibration preventing means of FIG. 5.

FIG. 5 is a perspective view showing an example of modification of the mode changeover device of FIG. 2, and FIG. 6 is an elevational view showing the details of the vibration preventing mechanism shown in FIG. 5. This example of modification is comprised of the addition of a vibration preventing device (48, 49) into the mechanism of FIG. 2. The other parts are similar in construction and arrangement to those shown in FIG. 2. This vibration preventing device of the invention comprises a slide 48 positioned on the mode changeover slide 46 of FIG. 2 and having a pair of vertically elongated slots 48a registering with respective slots 46a of the mode changeover slide 46 and in which the respective common guide pins 47 are engaged. The slide 48 is movable independently of the slide 46, but connected to the slide 46 by a tension helical spring 49 so that when the mode changeover slide 46 is moved downwardly, the vibration preventing slide 48 is driven for movement in a spring biased following manner to absorb vibrations which are caused to occur during the riding-on process of the first input member 27c of the in-and-out cam follower lever 27 onto the first cam portion 46b of the mode changeover slide 46 past the tapered portion thereof, because the first input member 27c oscillates horizontally at the free end thereof adjacent the mode changeover slide 46 as the in-and-out cam follower lever 27 operates with the camming surface 20b of the compound cam 20. For this purpose, the slide 48 is provided with first and second camming surfaces $48_1$ and $48_2$ for the free end of the first input member 27c arranged so that before the input member 27c rides on the first camming surface $48_1$ registering with the highest portion of the first cam portion 46b of the slide 46, the input member 27c is depressed in engagement with the second camming surface $48_2$ under the vibration-absorbing action of the spring 49.

What is claimed is:

1. A motion picture projector capable of using movie film and of selecting various modes of operation, comprising:
  (a) a housing having a film path therein and an image reproducing location for reproducing an image present on the film passing along the film path;
  (b) a projection light source in said housing arranged in relation to the film passing along the film path within the image reproducing location;
  (c) an optical projection means in said housing arranged in a position corresponding to the projection light source sandwiching the film path in the image reproducing location therebetween:
  (d) a film feeding means in said housing for intermittently transporting the film passing along the film path in the image reproducing location, including:
    a pull-down claw means engageable with the film at the image reproducing location;
    a rotary cam means for actuating the pull-down claw, and including:
      a first cam means for cyclically engaging the film to said claw means; and
      a second cam means for reciprocating said claw means along the film path;
    a first coupling means for coupling said first cam means and said claw means; and
    a second coupling means for operatively coupling said second cam means and said claw means;
  (e) a slow motion picture projection control means in said housing, including:
    a slow motion picture projection cam means for engaging the film to the cam means at a slower cycle than the cycle applied to said claw means by said first cam means; and
    a third coupling means for forcibly operatively coupling said slow motion picture projection cam means between said first coupling means and said first cam means; and
  (f) a change-over means accessible on the exterior of said housing for forcibly blocking said claw means from selective engagement with the film and for operatively coupling said first coupling means and said claw means; including
    a first mode cam means for operating said first coupling means and said claw means; and
    a second mode cam means for inactivating said first coupling means and said claw means and preventing said claw means and said film from engaging each other, thus allowing still picture projection.

2. A motion picture projector, according to claim 1, in which said first mode cam means and said second mode cam means of said change-over means are formed integrally with a plate, wherein said plate is linearly slidable and controls said first coupling means and said claw means during its slidable displacement.

3. A motion picture projector according to claim 2, in which said change-over means includes a vibration prevention means for supplying biasing power and preventing said coupling means from vibrating during the period of time when said second mode cam means provides control over said first coupling means and said claw means.

4. A motion picture projector capable of using movie film and of selecting various modes of operation, comprising:
(a) a housing having a film path therein and an image reproducing location for reproducing an image on the film;
(b) a film gate means in said housing defining the film path through which the film passes within said image reproducing location, said film gate means having a projection aperture;
(c) a projection light source in said housing arranged in relation to said aperture of said film gate means;
(d) an optical projection means in said housing arranged in a position corresponding to the projection light source sandwiching the film gate therebetween;
(e) a film pressing plate means in said housing for retaining the film in a standstill state in said film gate means, said plate means positioned facing said film gate means for sandwiching said film path therebetween and biased into pressure contact with said film gate means, said plate means having an aperture at a position corresponding to the aperture of said film gate means;
(f) a first film feeding means in said housing for intermittently transporting the film along the film path within said image reproducing location and resisting the power which binds the film on said film gate means, including;
a pull-down claw means engageable with the film at the image reproducing location;
a rotating cam means for actuating the pull-down claw means and including:
a first cam means for engaging the film cyclically to said claw means; and
a second cam means for reciprocating said claw means along the film path;
a first coupling means for operatively coupling said first cam means with said claw means; and
a second coupling means for operatively coupling said second cam means and said claw means;
(g) a second film feeding means in said housing for continuously transporting the film in the forwarding direction and the rewinding direction at a rapid speed by selective change-over;
(h) a slow motion picture projection control means located in said housing; and including:
a slow motion picture projection cam means for engaging the film to the claw means at a cycle slower than the cycle applied to said claw means by said first cam means; and
a third coupling means for forcibly operatively coupling said slow motion picture projection cam means between said first coupling means and said first cam means;
(i) a driving means in said housing for actuating said rotating cam means of said first film feeding means, said slow motion picture projection cam means and said second film feeding means; said driving means including at least one motor which is operatively coupled to said rotating cam means of said first film feeding means, said slow motion picture projection cam means and said film feeding means; and
(j) a mode change-over means in said housing and accessible from the exterior thereof for operating said change-over means, said mode change-over means including:
a first mode cam means for permitting said film pressing plate means to perform the above mentioned function effectively and for permitting said first coupling means to function effectively;
a second mode cam means for permitting said film pressing plate means to perform the above mentioned function effectively and for forcibly inactivating said first coupling means, and further for preventing said claw means and said film means from engaging with one another; and
a third mode cam means for forcibly separating said film pressing plate means from said film gate means and at the same time for forcibly inactivating said first coupling means for preventing said claw means from engaging with the film so that said second film feeding means can function effectively.

5. A motion picture projector according to claim 4, wherein said first mode cam means, said second mode cam means and said third cam means of said mode change-over means are formed integrally with a plate, and said plate is slidable linearly from the exterior of said housing and controls said first coupling means, said claw means, and said film pressing plate means, in turn, during its slidable displacement.

6. A motion picture projector according to claim 5, in which said change-over means has a vibration prevention means which gives such biasing power as preventing said coupling means from vibrating to said coupling means during such period of time that at least one of said second mode cam means and said third mode cam means conducts the above mentioned control on said first coupling means and said claw means.

7. A motion picture projector capable of using a film strip, comprising:
(a) a housing having a film path thereon and an image reproducing location for reproducing an image present on the film;
(b) a film gate means in said housing defining the film path through which the film passes within said image reproducing location, said film gate means having a projection aperture;
(c) a film pressing plate means in said housing for restraining the film in a standstill state in said film gate means, said plate means positioned facing said film gate means for sandwiching said film path therebetween, and biased into pressure contact with said gate means, said plate means having an aperture at a position corresponding to the aperture of said film gate means;
(d) a film feeding means in said housing for intermittently transporting the film through the film path within said image reproducing location and resisting the power which binds the film on said film gate means, including:
a pull-down claw means engageable with the film at the image reproducing location;
a rotating cam means for actuating the pull-down claw means, and including:
a first cam means for cyclically engaging the film to said claw means; and
a second cam means for reciprocating said claw means along the film path;
a first coupling means for operatively coupling said first cam means and said claw means; and a second coupling means for operatively coupling said second cam means and said claw means;

(e) a slow motion picture projection control means in said housing including:
   a third coupling means for engaging the film to said claw means at a cycle slower than the above mentioned cycle applied to said claw means by said first cam means; and
   a third coupling means for forcibly operatively coupling said slow motion picture cam means between said first coupling means and said first cam means; and (f) change-over means in said housing for controlling said film feeding means and said film pressing means, said change-over means being slidably displaceable between a first position, a second position and a third position, and having:
   a first mode cam means for controlling said first coupling means so that said claw means is prevented from engaging the film when said change-over means is positioned either in said second position or in said third position; and
   a second mode cam means for forcibly separating said film pressing plate means from said film gate means when said change-over means is positioned in said third position.

8. A motion picture projector, according to claim 7, including a plate, and said first mode cam means and said second mode cam means of said change-over means formed integrally with said plate.

9. A motion picture projector according to claim 8, wherein said first mode cam means formed on a side edge of said plate and said second mode cam means protruding from a surface of said plate.

10. A motion picture projector according to claim 9, wherein said first coupling means having an actuating portion operatively coupled with the side edge of said plate on which said first mode cam means is formed, and said film pressing plate means having an actuating portion operatively coupled with the surface of said plate from which said second mode cam means protrudes.

* * * * *